United States Patent [19]

George

[11] 4,239,263
[45] Dec. 16, 1980

[54] SPHERICAL CONNECTOR HAVING INTEGRALLY FORMED OUTLETS

[75] Inventor: Henry H. George, Louisville, Ky.

[73] Assignee: Allegheny Ludlum Industries, Inc., Pittsburgh, Pa.

[21] Appl. No.: 4,250

[22] Filed: Jan. 18, 1979

[51] Int. Cl.³ .............................................. F16L 41/00
[52] U.S. Cl. .................................. 285/150; 29/157 T; 228/161; 228/173 C; 285/286
[58] Field of Search ....................... 285/150, 286, 156; 29/157 T; 228/161, 184, 173 C

[56] References Cited

U.S. PATENT DOCUMENTS

| | | | |
|---|---|---|---|
| 691,454 | 1/1902 | Dies | 29/157 T |
| 2,787,050 | 4/1957 | Markl | 24/157 T |
| 3,186,431 | 6/1965 | Moore | 285/286 X |
| 3,392,994 | 7/1968 | Moore | 285/286 X |
| 3,499,669 | 3/1970 | Hoit | 285/286 X |
| 3,690,702 | 9/1972 | Moore | 285/286 X |

FOREIGN PATENT DOCUMENTS 886985  8/1953  Fed. Rep. of Germany ........... 285/286

Primary Examiner—Dave W. Arola
Attorney, Agent, or Firm—Vincent G. Gioia; John K. Williamson

[57] ABSTRACT

A spherical fitting for intercoupling multiple sections of pipe has integral, radially extending, pipe-receiving outlets formed on the spherical body of the fitting. Each outlet is provided with an annular bevel on its outermost end for mating with a respective pipe section in a manner to present a joint configured to permit utilization of a full penetration circumferential weld. In an alternate application, the spherical fitting may be employed as a connector to join structural members in a tubular trusswork such as an offshore oil drilling platform.

5 Claims, 2 Drawing Figures

SPHERICAL CONNECTOR HAVING INTEGRALLY FORMED OUTLETS

BACKGROUND ART

It is understood in the art that spherical fittings may be utilized advantageously in pipelines and tubular structures to reduce stress concentrations in the joints between pipe sections or structural members. Spherical fittings are ideally configured for uniformly distributing loads and stresses throughout the joint.

However, spherical fittings have not found wide spread application in the industry primarily because of the fact that they are relatively expensive to fabricate, and in addition, conventional spherical fittings may themselves introduce areas of stress concentration in the joint. In this later regard, spherical fittings typically comprise a hollow spherical body on which radially extending outlets are welded to permit intercoupling with pipes in the system. In the case of a tubular trusswork, the structural members themselves may be shaped to mate with the outer surface of the spherical body for welding thereon such that the need for radially extending outlets is obviated. In either instance, welding at the high stress area immediately adjacent the spherical surface of the fitting body may introduce sources of stress concentration and crack initiators if not performed properly. This problem is compounded by the fact that construction of tubular trussworks and pipelines is often times performed in areas where nondestructive testing of the welded joint is virtually impossible.

DISCLOSURE OF INVENTION

The present invention overcomes problems associated with conventional spherical fittings by the provision of a fitting having integrally formed outlets to present a smooth, continuous transition from the spherical surface of the fitting body to the outermost pipe-mating ends of the outlets. The drawn outlets provide the lowest level of stress concentration and permit the use of only a single, full penetration circumferential weld in attaching the pipe or structural member to the spherical body of the fitting.

As is apparent from the method described herein, integral outlets of various sizes may be formed in a predetermined pattern as desired to permit wide latitude in the design of joints for piping systems or tubular structures, without requiring additional extensive stress analysis.

BEST MODE FOR CARRYING OUT THE INVENTION

Figure 1:
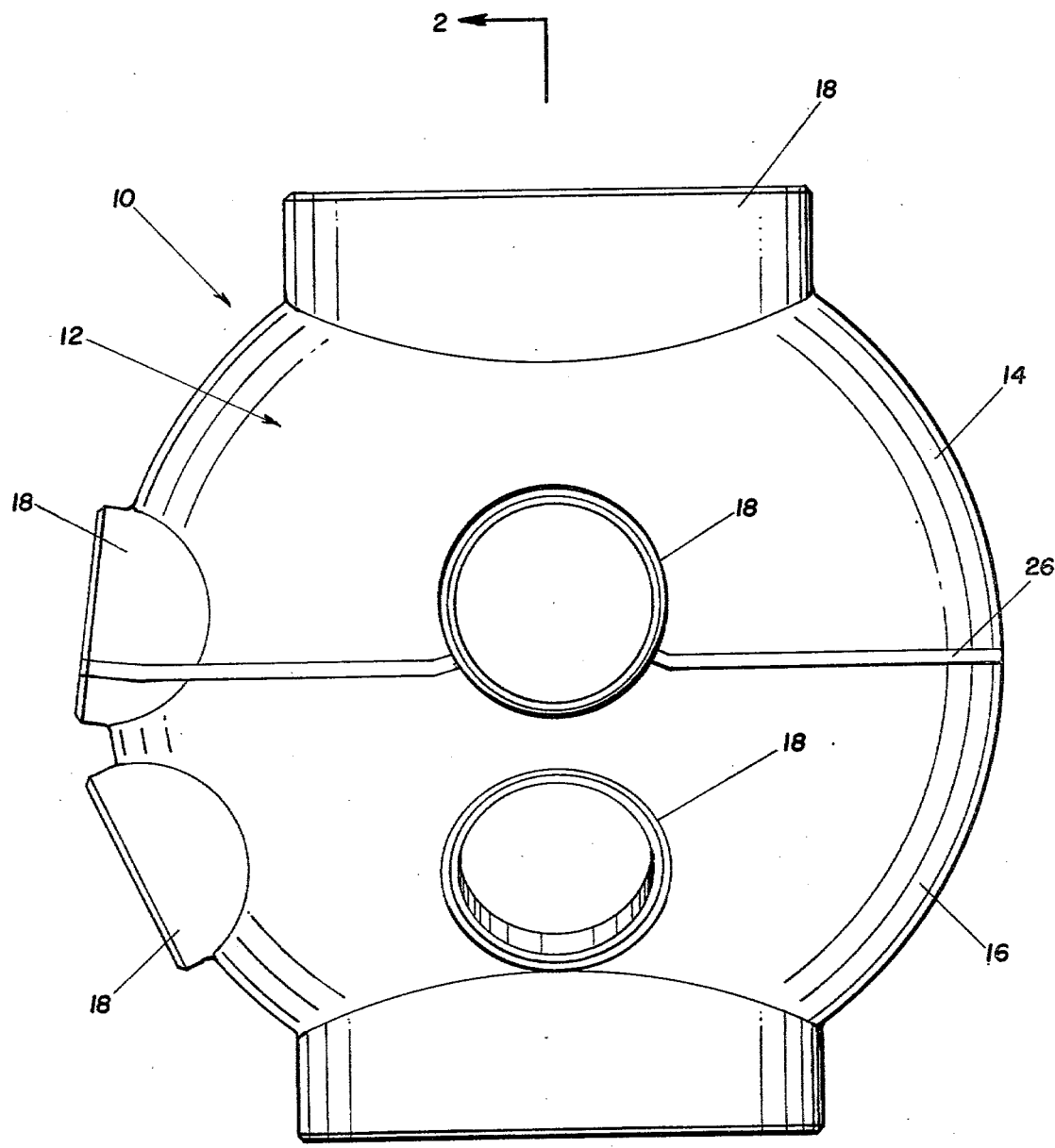
FIG. 1 is a front elevational view of a spherical fitting constructed in accordance with the principles of the present invention.

In FIG. 1, there is shown a spherical fitting 20 of the type suited for interconnecting pipe sections in a piping system or for coupling structural members in a tubular trusswork. Typically the fitting 10 is constructed of carbon steel having a minimum yield strength in the range of from 52,000 to 100,000 psi, though it is to be understood that virtually any formable material might be used in the practice of the present invention.

The fitting 10 comprises a hollow spherical body 12 formed from a pair of hemispherical sections 14, 16, and a plurality of cylindrical, tubular protuberances or outlets 18 formed integrally from the wall of the body 12 and extending radially outwardly therefrom.

Each of the outlets 18 has an outermost, pipe engaging end 20 adapted to be joined by welding to one end of a respective pipe or structural tubular member. In order to enhance the welding of this connection, each end 20 has an annular bevel 22 for mating with a corresponding bevel on a respective pipe end whereby coupling can be accomplished using a simple circumferential butt weld.

Figure 2:
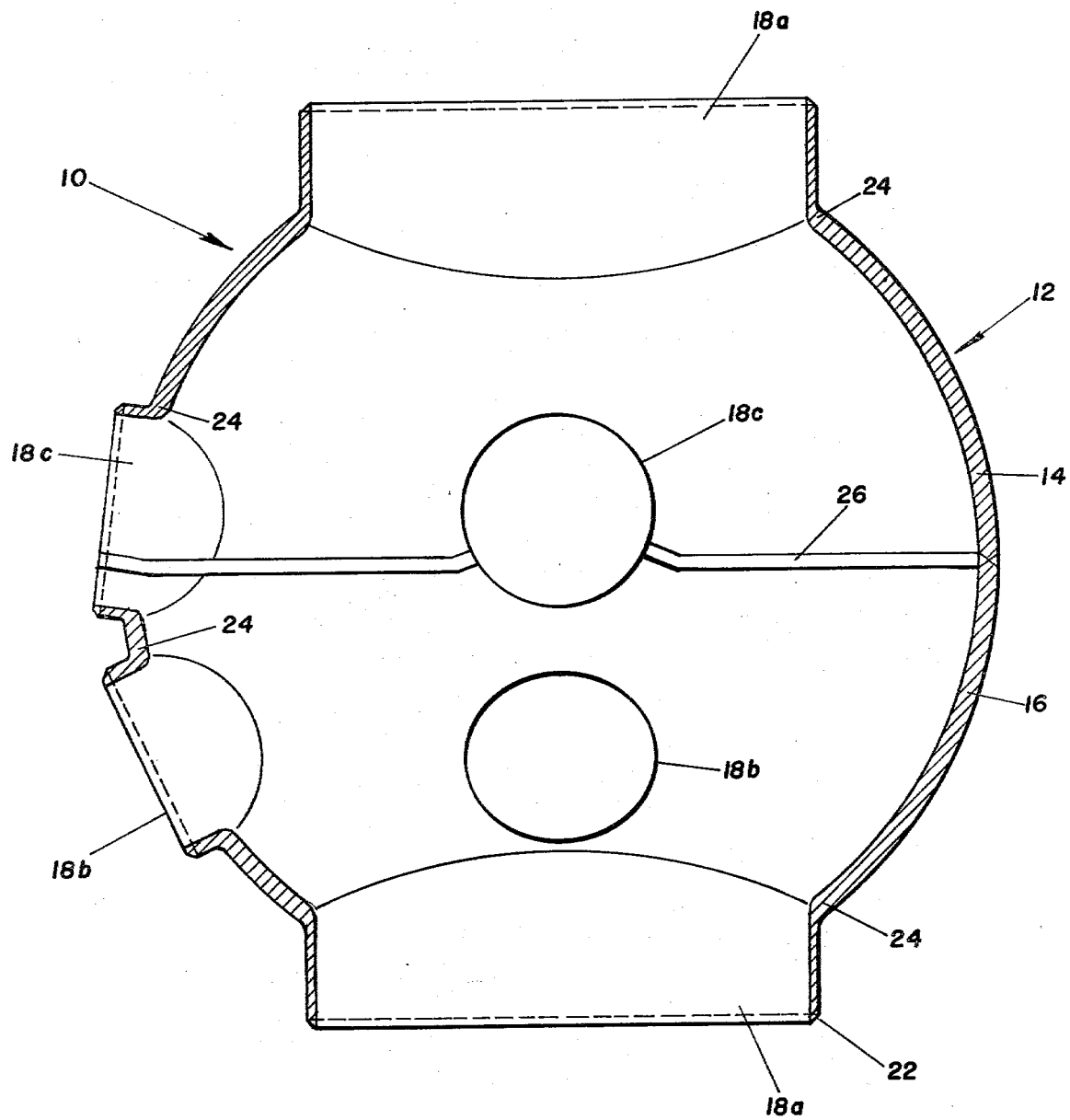
FIG. 2 is a cross-sectional view taken along line 2—2 of FIG. 1.

Considering now FIG. 2, it is noted that the outlets 18 may be of various sizes and configurations as determined by the pipes or structural members which are to be interconnected by the fitting 10. Thus for example, the outlets 18a are somewhat longer, and of a larger diameter than either the outlets 18b or 18c. Likewise, the outlets 18b have a greater wall thickness than the outlets 18c even though the length and diameters of these outlets are substantially equal. Such variations in the dimensions of the outlets 18 are within the purview of known manufacturing techniques as will be explained hereinbelow.

An important feature of the present invention is the smooth, structurally continuous transition areas 24 between the respective outlets 18 and the body 12. By this construction, loads and stresses directed along the connected components toward the fitting 10 are uniformly distributed thereby reducing areas of stress concentration and problems appurtenant thereto. This feature is particularly enhanced by virtue of the fact that no welding or other structural discontinuity is present in any of the transition areas 24.

Considering now the manufacture of the fitting 10, initially the hemispherical sections 14, 16 are formed from flat sheets using conventional techniques. Apertures are then drilled through the wall of the sections 14, 16 at predetermined locations, and subsequently, forming balls of desired sizes are drawn through the apertures in a radially outwardly direction to fashion the various outlets 18. The drawing operation with the forming ball may be either a free pull or, if closer tolerances are desired, an external forming die may be used in association with the forming ball. It may be required to heat the area adjacent the aperture prior to the drawing operation. Manifestly, outlets 18 of various sizes and configurations can be obtained by the use of different size forming balls end mating dies.

Next, the outermost ends of the outlets 18 are faced to present the squared, pipe-engaging ends 20. In a subsequent machining operation, an annular bevel 22 is formed on each of the ends 20 for the purpose described hereinabove.

Finally, the hemispherical sections 14, 16 are joined together at their bases as by a weld 26 to form the fitting 10. It is noted that the outlets 18c shown in FIG. 2 pass through the weld 26 and hence, these outlets must be formed subsequent to welding of the sections 14, 16. This is possible only because of the fact that the outlets 18a are large enough to permit access into the interior of the body 12 and further because the outlets 18c are appreciably smaller than the outlets 18a.

INDUSTRIAL APPLICABILITY

The present invention offers an improved, highly versatile tool for designers of piping systems and tubular structures. In either field of application, the fitting 10 represents the most effective means for uniformly distributing stresses imparted to the joints between interconnected pipes or structural members.

As explained previously, the unique provision of forming the outlets 18 intergrally with the spherical body 12 results in the advantage that no discontinuities or potential stress risers are present in the critical transition areas 24. Moreover, the configuration of the outlets 18 permits interconnection of the fitting 10 with pipes or structural members using simple circumferential butt welds. For these reasons, it is clear that the present invention represents a significant advancement over prior art devices.

I claim:

1. A structural fitting for connecting tubular members, said fitting including:
   a hollow spherical body comprising a pair of hollow hemispherical members joined at their bases,
   there being a circular line of attachment defined by the intersection of said bases; and
   at least a pair of tubular protuberances integrally formed from the wall of said body and extending radially outwardly therefrom,
   one of said protuberances passing through said line of attachment.

2. The invention of claim 1, said protubertances being generally cylindrical and each having a diameter greater than its length.

3. The invention of claim 2, said protuberances being butt welding outlets, the outermost end of each protuberance being provided with an annular bevel for complementally engaging the beveled end of a tubular member.

4. The method of forming a spherical fitting having tube-receiving protuberances, comprising the steps of:
   fabricating a pair of substantially identical, hollow hemispherical sections;
   fashioning aperatures in the hemispherical sections at predetermined locations;
   drawing a forming ball radially outwardly through each of said aperatures to form a number of radiating protuberances on said section;
   intercoupling said sections along the bases thereof to form a spherical body, there being a circular line of attachment circumscribing said body at the intersection of said bases;
   inserting a second forming ball, smaller than said first-mentioned forming ball, into said body through one of said protuberances; and
   forming a hole in the wall of said body, said hole passing through said line of attachment and being of a diameter smaller than the largest of said aperatures;
   drawing said second forming ball radially outwardly through said hole to form another radiating protuberance on said body.

5. The method of claim 4; and machining an annular bevel on the other end of each protuberance whereby to fashion butt welding outlets on the spherical body.

* * * * *